United States Patent [19]

Jackson

[11] Patent Number: 4,624,829

[45] Date of Patent: Nov. 25, 1986

[54] NUCLEAR FUEL ASSEMBLY CHANNEL SPRING AND STOP ASSEMBLY AND METHOD OF USING SAME

[75] Inventor: Leigh F. Jackson, Hempfield Township, Westmoreland County, Pa.

[73] Assignee: Westinghouse Electric Corp., Pittsburgh, Pa.

[21] Appl. No.: 599,898

[22] Filed: Apr. 13, 1984

[51] Int. Cl.⁴ .............................................. G21C 3/32
[52] U.S. Cl. .................................. 376/448; 376/438; 376/434
[58] Field of Search ........................ 376/448, 438, 434

[56] References Cited

U.S. PATENT DOCUMENTS

| Re. 27,173 | 9/1971 | Lass ...................................... | 376/448 |
| 3,350,275 | 10/1967 | Venier et al. . | |
| 3,466,226 | 9/1969 | Lass . | |
| 3,802,995 | 4/1974 | Fritz et al. . | |
| 4,304,635 | 12/1981 | Lippert ................................. | 376/448 |

*Primary Examiner*—Donald P. Walsh

[57] ABSTRACT

A nuclear fuel assembly channel spring and stop assembly having a separate channel spring assembly and stop assembly. A bi-directional channel spring is mounted by means of a plate to prevent rotation of the spring assembly relative to the upper fixture plate assembly of the fuel assembly. The stop member is formed integrally with the upper fixture plate assembly or mounted with a captive device to prevent rotation of the stop member relative to the upper fixture plate assembly.

15 Claims, 6 Drawing Figures

NUCLEAR FUEL ASSEMBLY CHANNEL SPRING AND STOP ASSEMBLY AND METHOD OF USING SAME

BACKGROUND OF THE INVENTION

1. Field of the Invention:

The device of the present invention generally relates to nuclear fuel assemblies for use in nuclear reactors, and, more particularly, to a new and improved channel spring and stop assembly for a nuclear fuel assembly especially adapted for use in a boiling water reactor (BWR).

2. Description of the Prior Art:

The generation of a large amount of heat energy through nuclear fission in a nuclear reactor is well known. This energy is dissipated as heat in elongated nuclear fuel rods. A plurality of the nuclear fuel rods are grouped together to form separately removable nuclear fuel assemblies. A number of such nuclear fuel assemblies are typically arranged in a matrix to form a nuclear fission reaction. The core is typically submersed in a fluid, such as light water, that serves as a coolant for removing heat from nuclear fuel rods and as a neutron moderator.

A typical nuclear fuel assembly may be formed by a 7×7 or an 8×8 array of spaced-apart, elongated rods supported between upper and lower tie plates.

Examples of such typical nuclear fuel assemblies are depicted in and described in U.S. Pat. Nos. 3,350,275; 3,466,226 and 3,802,995. In a typical core the matrix of fuel assemblies must be maintained in a fixed spatial relationship. A known technique for maintaining a spacing in the channel between fuel assemblies is disclosed in U.S. Pat. No. Re. 27,173 which employs a spring biasing technique intended to compensate for variations in fuel assembly lengths and widths by mounting spring assemblies on adjacent fuel assemblies so that the springs of adjacent assemblies bias against each other to maintain a separation force. A stop member associated with the springs is utilized to assure minimum separation between fuel assemblies.

A large BWR reactor core typically comprises dozens of fuel assemblies not all of which are removed and replaced during each refueling event. Therefore, the replacement fuel assemblies must be physically and dimensionally compatible with the existing fuel in the core and must not interfere with the channels between fuel assemblies or with the movement of control rods.

Moreover, replacement fuel assemblies must be designed with a channel spring and stop assembly which can maintain a fixed spatial relationship between adjacent fuel assemblies and which has a compatible interface with existing fuel assembly designs.

It is also desirable for replacement fuel assembly to be designed for ease of manufacturing and to afford flexibility in adapting new fuel to existing fuel assemblies.

SUMMARY OF THE INVENTION

It is therefore an object of the invention to provide a novel channel spring and stop assembly.

It is a further object of the invention to provide a channel spring and stop assembly compatible with existing fuel assembly designs.

It is a still further object of the invention to provide a BWR fuel assembly for refueling which is configured to interface with existing fuel assemblies.

It is still further object of the present invention to provide a channel spring and stop assembly wherein the spring assembly and stop assembly are separate and distinct.

Moreover, it is an object of the present invention to provide a stop assembly which can be mechanically attached to an upper fixture plate assembly or which can be integral with it.

These, as well as other objects and advantages of the present invention are realized by providing a channel spring and stop assembly for a nuclear fuel assembly having an upper fixture plate assembly and a flow channel member. In accordance with the present invention, a spring assembly comprises a bi-directional spring member having a pair of generally orthogonally disposed springs extending generally downwardly from the fixture plate assembly and generally parallel and adjacent to the flow channel. A spring adaptor member is provided for mounting the bi-directional spring member to a frame in such a manner as to prevent rotation of the spring member relative to the frame. A stop member, separate from the spring assembly, extends from the fixture plate assembly and protrudes from the flow channel into the space between fuel assemblies to insure minimum clearance between adjacent flow channels.

BRIEF DESCRIPTION OF THE DRAWINGS

The accompanying drawings, which are incorporated in and form a part of the specification illustrate two embodiments of the present invention and, together with the description, serve to explain the principles of the invention. In the drawings.

DETAILED DESCRIPTION OF THE PREFERRED EMBODIMENTS

Reference will now be made in detail to the presently preferred embodiments of the invention, an example of which is illustrated in the accompanying drawings.

Figures 1, 1A:
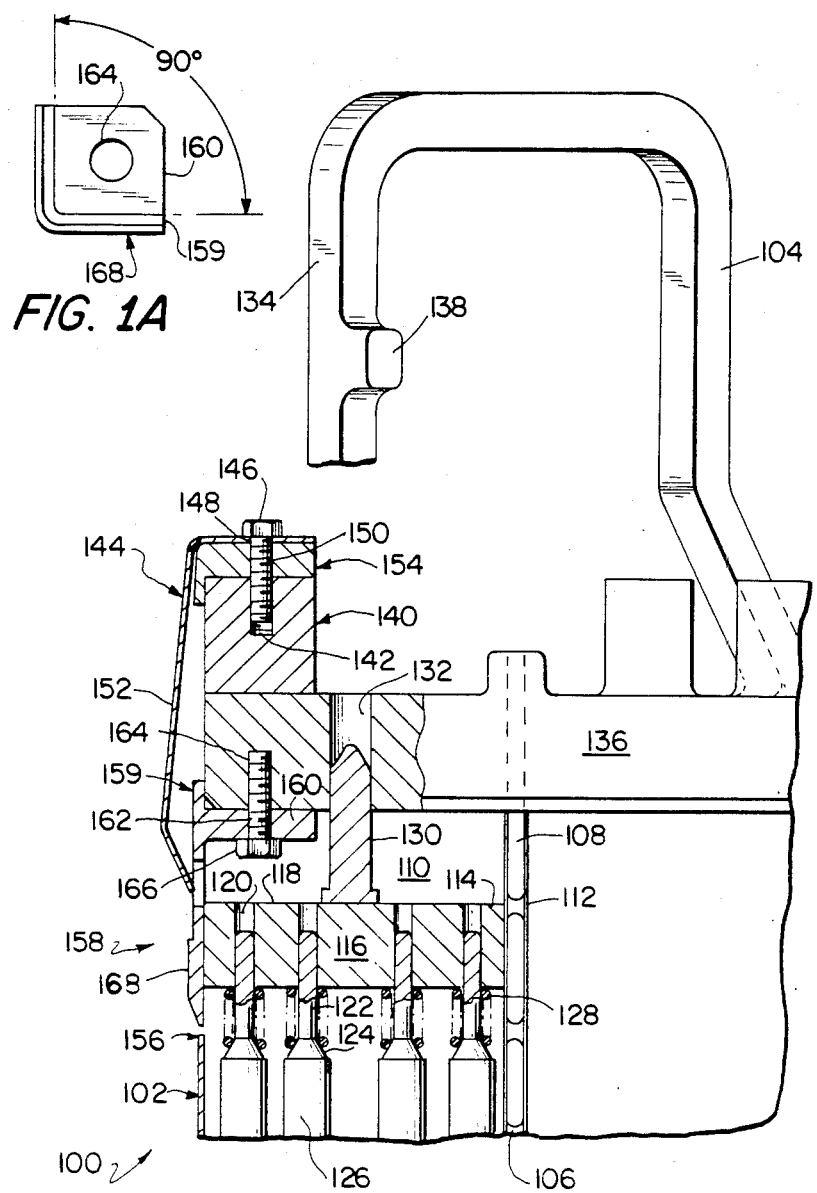
FIG. 1 is a fragmentary elevation view, in partial section, of the top portion of a fuel assembly showing the channel spring assembly and mounting flange of the present invention.
FIG. 1A is a top view of the stop member of FIG. 1.

Turning first to FIG. 1, there is illustrated fuel assembly 100 constructed in accordance with the principles of the present invention. The fuel assembly 100 includes an elongated, flow impervious, outer flow channel 102 that is preferably formed from an alloy of zirconium commonly known as Zircaloy, that extends substantially along the entire length of the fuel assembly 100 and that structurally interconnects an upper yoke 104 with a lower base (not illustrated). Preferably, the yoke 104 is formed from reactor grade stainless steel.

A central water cross 106 provides a centrally located closed flow path for a subcooled neutron moderator along the length of the fuel assembly 100. The central water cross 106 has its uppermost end 108 in the vicinity of the upper end of the flow channel 102. Other BWR fuel assemblies, using moderator rods instead of a central water cross 106 are also contemplated to be within the scope of the present invention. The explanation below, which describes a fuel assembly utilizing a water cross, is exemplary only and should not be taken to be limited in that regard.

Typically, the central water cross 106 together with the inner walls of the flow channel 102 divide the fuel assembly 100 into four separate, elongated, fuel sections or quadrants 110 along the length of the fuel assembly 100. A plurality of sealed passages 112 may be formed through the central water cross 106 and provide for coolant flow between the separate fuel sections 110. The sealed passages 112 are distributed along the length of the central water cross 106 and provide for fuel bundle coolant pressure equalization between adjacent, alongated fuel mini-bundles or subassemblies 114, each located in one of the four separate fuel sections 110.

Each fuel bundle 114 includes an upper tie plate 116, and a plurality of elongated fuel rods 126. In the illustrated embodiment, each fuel bundle 114 includes a plurality of sixteen fuel rods 126 arranged in a 4×4 array; and each fuel rod 126 includes an upper end plug 124. Other fuel matrix configurations can obviously be substituted.

The upper tie plate 116 may be fabricated as a connected series of thin metal bars or strips 118 and is formed by any convenient means such as by casting, machining. At each of the sixteen fuel rod lattice positions in the 4×4 array illustrated, a small cylindrical aperture 120 is drilled or otherwise formed in the tie plate 116 to receive with a slip fit an elongated, vertical extension 122 of the upper end plug 124 of the fuel rod 126. The slip fit between the upper tie plate 116 and the fuel rods 126 provides lateral restraint for the fuel rods but permit relative axial movement between the fuel rods and upper tie plate 116. A plurality of elongated compression springs 128 are disposed over the vertical extensions 122 of the upper end plugs 124 and react against the lower surface of the upper tie plate 116 to maintain the fuel rods 126 seated in the lower tie plate (not illustrated). The upper and lower tie plates are held in a spaced apart relationship by one or more conventional tie rods (not illustrated) which extend between and are fastened to the upper and lower tie plates, each mini-bundle 114 preferably has two tie rods.

The upper tie plate 116 also includes an elongated vertical post or locating pin 130 that is designed to pass through and to be received with a slip fit by a pin receiving aperture 132 for permitting relative axial or vertical motion between the fuel bundle or subassembly 114 and both the yoke 104 and the flow channel 102 while restraining lateral or radial motion of the fuel bundle 114.

The upper yoke 104 may include an integrally formed lifting bail or handle 134 that projects upwardly from and diagonally across a generally square shaped frame or upper fixture plate assembly 136 of the yoke 104. The upper plate assembly 136 is preferably of a minimum size and mass in order to minimize the fluid pressure drop thereacross. The handle 134 includes an orientation indicating boss 138 and is designed to be engaged by a lifting mechanism for lifting and handling the fuel assembly 100 in a vertical position. By interconnecting all four bundles 114 through the apertures 132, the yoke 104 causes the bundles 114 to move together and thereby minimizes loadings that otherwise might occur from one bundle to another.

The yoke 104 may further include a mounting post 140 preferably integrally formed on the frame 136 and having an elongated threaded aperture 142 formed therein for receiving a spring assembly 144 and an elongated, threaded, spring assembly retaining bolt 146. The bolt 146 is designed to pass through a pair of apertures 148 and 150 respectively formed through a bi-directional leaf spring 152 and a spring adaptor plate or angle 154 for threaded engagement with the aperture 142 to retain spring assembly 144 in engagement with the mounting post 140. The bi-directional leaf spring is designed to contact corresponding leaf springs on adjacent fuel assemblies to maintain spacing between adjacent fuel assemblies and to transmit loads from one fuel assembly to another.

To accommodate the radially outwardly projecting portions of the spring assembly 144, the upper end of the outer flow channel 102 may be provided with a plurality of appropriately configured cutouts 156. Further details of the fuel assembly may be had by reference to commonly assigned, copending application Ser. No. 368,555 filed Apr. 15, 1982 and incorporated by reference herein.

The fuel assembly 100 further includes a stop assembly 158 for insuring a mid-channel separation between adjacent flow channels 102. An important aspect of the present invention lay in the fact that channel spring assembly 144 is structurally separate and distant from the stop assembly 158 yet will functionally interact with prior spring and stop assemblies such as that depicted in U.S. Pat. No. Re. 27,173 so that fuel assemblies of the present configuration can be interfaced with prior art fuel assemblies in a reactor core. In this regard it should be noted that the bi-directional springs 152 of the present invention are designed to physically interface with and have compatible load-deflection characteristics as the mating spring of the piror art fuel assembly.

The stop member assembly 158 preferably comprises a mounting flange 160 having a bore 162 which aligns with a threaded bore 164 in the frame 136. A bolt 166 is used to secure the stop assembly 158 to the frame 136. The stop assemblies 158 further comprises a means 168 for insuring a minimum spacing between adjacent fuel assemblies. Such means may comprise a bumper or raised band which is dimensioned and disposed to coact with the minimum channel spacer device of adjoining fuel assemblies, thus insuring that a predetermined minimum gap is maintained between adjacent channels 102 for coolant flow and control rod movement. In this regard, it should be noted that the bumper 168 projects into the space between adjacent flow channels 102.

As explained above, in the illustrated embodiment, the stop assembly 158 is preferably bolted to the the frame 136 to allow for use of various stop member configurations depending upon the design of the fuel assemblies already in the core being refueled. Where such flexibility is not required, it should be appreciated that the stop assembly 158 can be integrally formed with the frame 136, such as by casting. Thus, the present design offers both design and manufacturing flexibility. In either case the flow channel 102 is preferably provided with the corner slot or cutout 156 to accomodate the protruding stop assembly 158.

As best seen in FIG. 1A, the stop member 158 has an upstanding rim 159 which extends above the flange 160 and which engages the frame 136 to prevent rotation of the stop assembly 158 relative to the frame 136.

Figure 2:
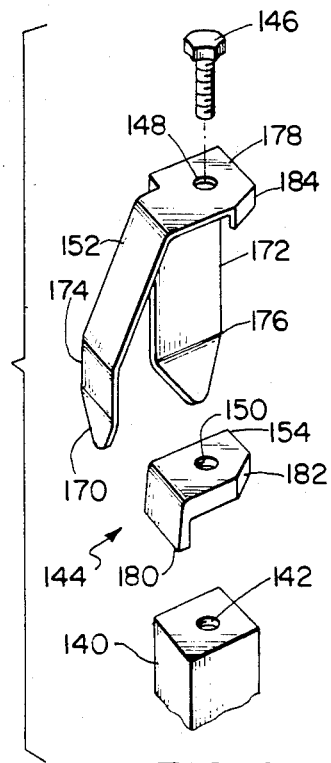
FIGS. 2 and 3 depict exploded, perspective views of two embodiments of a channel spring and adaptor base assembly.
Figure 3:
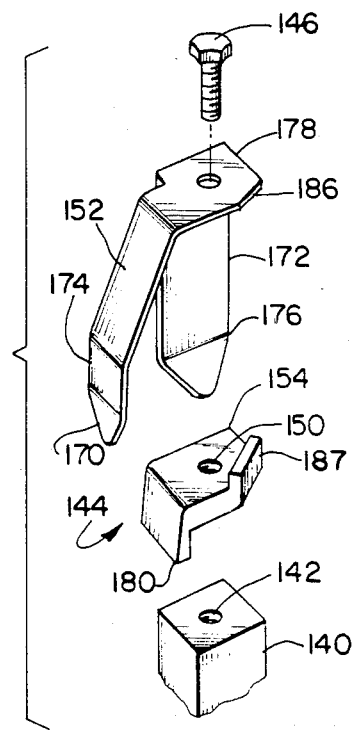

As alluded to above and as best seen in FIGS. 2 and 3, each bi-directional leaf spring 152 comprises two leaf springs 170 and 172 preferably formed from a single piece of spring material. As further detailed below, the spring member 170 has a protruding flat portion 174 while the spring member 172 has a protruding knee portion 176. The two spring members 170 and 172 are joined at a top section 178 having disposed therein the bore 148 for receiving the bolt 146.

The spring adaptor plate 154 is provided for supporting the leaf spring assembly 144 on the post 140 and for preventing the leaf springs 152 from rotating relative to the post 140. The spring adaptor plate 154 comprises a skirt portion 180 which follows the contour of the post 140 so as to prevent the adaptor plate from rotating. At a corenr of the plate 154, a portion 182 is cut away, preferably on a diagonal. In order to prevent the spring member 152 from rotating, means 184 are provided to lock it in place. Such means may comprise a downwardly extending flange portion 184 which engages the diagonal cut 182. As detailed above, the plate 154 has a bore 150 which is aligned with the bore 148 in the top portion 178 and the threaded bore 142 to secure the assembly 144 to the post 140.

Alternatively, the channel spring and stop assemblies may be configured in accordance with the illustration of FIG. 3 wherein the top portion 178 of the channel spring assembly is provided with a diagonal cut 186 which cooperates with an upstanding flange 187 on the adaptor plate 154 to prevent rotation of the spring assembly 144.

Using either the above embodiments, the spring assembly 144 is constrained rotationally by the adaptor plate 154.

Figure 4:
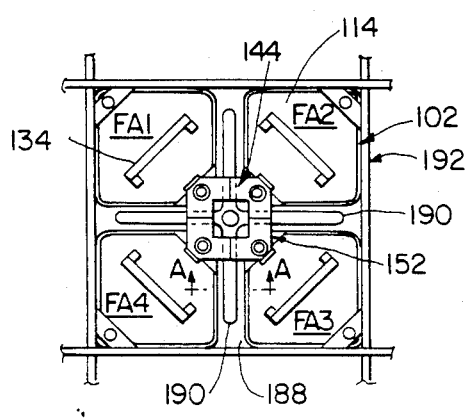
FIG. 4 is a top view of four adjacent fuel assemblies showing the channel spring assembly.

Turning now to FIG. 4 there is depicted an exemplary core section comprising four fuel assemblies FA1, FA2, FA3 and FA4, each of which has a handle 134 and is encased in a channel 102. A coolant flow channel 188 is maintained between channels 102 by the four interacting spring assemblies 144 having a total of eight leaf springs and the four opposing stop assemblies 158. Within the channel 188 is a cruciform type control rod assembly 190. The channel 188 must be maintained at a minimum width to permit free travel of the control rod assembly 190 within the channel under all seismic and loading conditions. A plurality of axially spaced grid structures 192, which form no part of the present invention, may be used with fuel assemblies.

Figure 5:
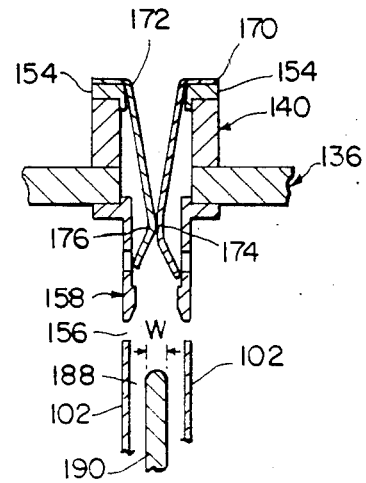
FIG. 5 is a section through section AA of FIG. 4.

Turning to FIG. 5 there is depicted a typical knee spring - flat spring engagement showing opposing stop assemblies.

The knee 176 of spring 172 engages the protruding flat portion 174 of spring 170. The springs are fastened to the post 140 and secured against rotation by the adaptor plate 154. The post 140 is secured to or integrally formed with the frame 136. The flow channel 102 is formed with the slot or cutout 156 for accomodating the channel spring and stop assemblies 144 and 158. As alluded to above, the stop assemblies 158 have bumpers 168 which protrude into the coolant flow channel 188 a sufficient amount to insure space will be maintained for passage of the control rod assembly 190.

The flat portion 174 of the spring 170 will permit a degree of axial misalignment or movement between adjacent fuel assemblies without significantly affecting the opposing contact faces. Therefore, even under transient or vibratory conditions the upper ends of the fuel assemblies are free to move within a limited axial range.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A channel spring and stop assembly for a nuclear fuel assembly having an upper fixture plate assembly and a flow channel member, said spring and stop assembly comprising:
   (a) a bi-directional spring member comprising a pair of orthogonally disposed springs, extending generally downwardly from said fixture plate assembly and generally parallel to and adjacent said flow channel member;
   (b) a spring adaptor member disposed between said bi-directional spring member and said fixture plate assembly for mounting said bi-directional spring member to said fixture plate assembly, said spring adaptor member having means for positively engaging said fixture plate assembly and said bi-directional spring member to prevent relative movement therebetween;
   (c) a stop member, separate from said spring adaptor member and extending from said fixture plate assembly and protruding from said flow channel member.

2. The channel spring and stop assembly of claim 1 wherein said fixture plate assembly further comprises a post and said means for positively engaging comprises a downwardly extending flange portion of said spring adaptor member, said downwardly extending flange portion being configured to engage an outside periphery of said post.

3. The channel spring and stop assembly of claim 2 further comprising means for fastening said bi-directional spring member and spring adaptor member to said post.

4. The spring and stop assembly of claim 2 wherein said means for positively engaging further comprises an upstanding flange portion of said spring adaptor member, and said bi-directional spring member further comprises a top portion having a means for engaging said upstanding flange portion to prevent rotation of said spring member relative to said post.

5. The channel spring and stop assembly of claim 2 wherein said bi-directional spring member further comprises a top portion having a downwardly extending flange portion and said means for positively engaging further comprises a means for engaging said downwardly extending flange portion to prevent axial rotation of said bi-directional spring member relative to said post.

6. The channel spring and stop assembly of claim 1 wherein said stop member is integrally formed with said fixture plate assembly.

7. The channel spring and stop assembly of claim 1 wherein said stop member comprises a downwardly extending flange having a band portion protruding from said fixture plate assembly past said flow channel, and a mounting flange, for fastening said stop member to said fixture plate assembly.

8. The channel spring and stop assembly of claim 7 wherein said mounting flange has a top lip for engaging said fixture plate assembly to prevent rotation of said stop member relative to said fixture plate assembly.

9. The channel spring and stop assembly of claim 1 wherein said flow channel member has a cutout in which said spring member and stop member are disposed.

10. A method of maintaining spacing between fuel assemblies in a nuclear reactor core, said fuel assemblies having an upper fixture plate assembly and a flow channel member, said method comprising the steps of:
   (a) positioning a bi-directional channel spring member having a pair of orthogonally disposed springs near the top of a fuel assembly and on said upper fixture plate assembly with a similar bi-directional spring member on an adjacent fuel assembly;
   (b) affixing said bi-directional channel spring member to said upper fixture plate assembly by means of a spring adaptor member which positively engages each of said bi-directional channel spring member and said upper fixture plate assembly to prevent relative rotational motion therebetween;
   (c) positioning a stop member having a bumper portion protruding from said flow channel member on an opposite side of said upper fixture plate assembly from said bi-directional channel spring member to coact with a similar stop member of an adjacent fuel assembly;
   (d) affixing said stop member to said opposite side of said upper fixture plate assembly to prevent axial movement therebetween;
   (e) dimensioning and positioning said separately affixed bi-directional spring member and stop member to coact with channel spring and stop members of existing nuclear reactor fuel assemblies in said reactor core.

11. A nuclear fuel assembly for a boiling water reactor (BWR), said fuel assembly having an upper fixture plate assembly, a flow channel member, and a channel spring and stop assembly comprising:
   (a) a bi-directional spring member comprising a pair of orthogonally disposed springs, extending generally downwardly from said fixture plate assembly and generally parallel to and adjacent said flow channel member;
   (b) a spring adaptor member disposed between said bi-directional spring member and said fixture plate assembly for mounting said bi-directional spring member to said fixture plate assembly, said spring adaptor member having means for positively engaging said fixture plate assembly and said bi-directional spring member to prevent relative movement therebetween;
   (c) a stop member, separate from said spring adaptor member and extending from said fixture plate assembly and protruding from said flow channel member.

12. The BWR fuel assembly of claim 11 wherein said fixture plate assembly further comprises a post and said means for positively engaging comprises a downwardly extending flange portion of said spring adaptor member configured to engage an outside periphery of said post and means for fastening said bi-directional spring member and spring adaptor member to said post.

13. The spring and stop assembly of claim 12 wherein said means for positively engaging further comprises an upstanding flange portion of said spring adaptor member, and said bi-directional spring member further comprises a top portion having a means for engaging said upstanding flange portion to prevent rotation of said bi-directional spring member relative to said post.

14. The assembly of claim 11 wherein said bi-directional spring member further comprises a top portion having a downwardly extending flange portion and said means for positively engaging further comprises a means in said spring adaptor member for engaging said downwardly extending flange to prevent axial rotation of said bi-directional spring member relative to said post.

15. The BWR fuel assembly of claim 11 wherein said stop member comprises a downwardly extending flange having a band portion protruding from said fixture plate assembly past said flow channel member, and a mounting flange, for fastening said stop member to said fixture plate assembly, said mounting flange having a top lip for engaging said fixture plate assembly to prevent rotation of said stop member relative to said fixture plate assembly.

* * * * *